United States Patent
Charlot, Jr.

[11] 3,716,854
[45] Feb. 13, 1973

[54] RADAR DETECTOR
[75] Inventor: Lincoln H. Charlot, Jr., Tampa, Fla.
[73] Assignee: Minnesota Mining & Manufacturing Company, Saint Paul, Minn.
[22] Filed: July 1, 1970
[21] Appl. No.: 51,542

[52] U.S. Cl.................343/5 PD, 331/36 C, 331/173
[51] Int. Cl..................................................G01s 9/02
[58] Field of Search............343/5 PD; 331/36 C, 173

[56] References Cited
UNITED STATES PATENTS 3,289,096  11/1966  Longuemare et al...........331/36 C X
2,741,701  4/1956  Harris..............................331/173 X
3,370,254  2/1968  Keller.............................331/36 C X

*Primary Examiner*—T. H. Tubbesing
*Attorney*—Kinney, Alexander, Sell, Steldt & Delahunt

[57] ABSTRACT

A pulsed radar detector the repetition rate of which is a function of the phase of the feedback signal in the radio frequency (rf) oscillator which produces the pulse of rf energy. A phase-shift circuit which makes the phase of the feedback signal essentially independent of the detector's environment, and a pulse spectrum limiter circuit which limits the pulse of energy to a relatively narrow spectrum of frequencies are disclosed.

8 Claims, 1 Drawing Figure

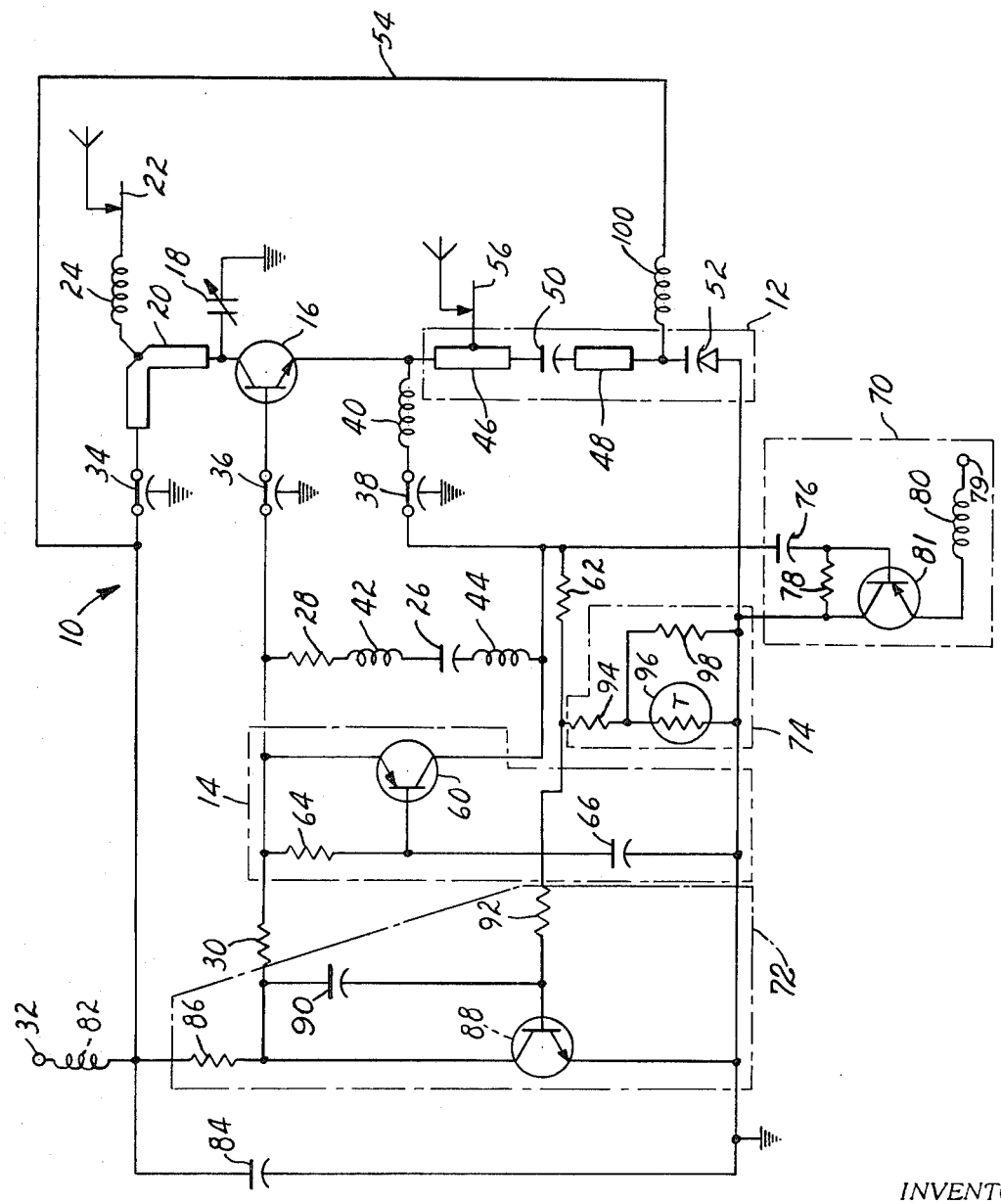

RADAR DETECTOR

BACKGROUND OF THE INVENTION

This invention relates to radar detectors in general and, more specifically, to pulsed radar detectors. In particular, the invention relates to pulsed radar detectors of the type in which the pulses are produced by biasing an amplifier with an input signal between a non-oscillating and and oscillating state, and in which the input (bias) signal rapidly increases as a result of the amplifier undergoing the transition from a non-oscillating to an oscillation state.

Such detectors are, for example, employed in security systems for what is sometimes referred to as space protection. In such applications, a detector propagates a wave in the form of pulses of radio frequency (rf) energy into the space to be protected. A circuit is provided for receiving rf energy from the space and for providing an indication when the received energy corresponds to an intrusion into the space. Commonly this circuit consists of the combination of an antenna which receives energy reflected by the environment (objects and surfaces which are located within and define the boundaries of the space) and a detector which responds to a predetermined change in the energy received by the antenna. If conditions within the space are quiescent, the received rf energy produces a signal in the receiving antenna which is unchanging. This or any other quiescent signal such as a signal representative of the oscillator repetition rate can conveniently be employed as a reference for detecting an intrusion condition. A signal differing a predetermined amount from the quiescent signal reference thus corresponds to a condition in the space characteristic of an intrusion. Accordingly, a desirable feature of a radar detector is that it produce a quiescent signal which is nearly independent of the environment.

Where the radar detector is to be used in a security system, the susceptibility of the system to compromise can be greatly reduced if the detector can be concealed. A pleasing appearance may also be desired, in which case it may be necessary to place the detector in a container not appreciably larger than the detector. In either case, at least part of both the transmitting and receiving antenna must be within the container. Consequently, a significant portion of the transmitted energy is received by the receiving antenna, the amount generally varying inversely as the container size and being of sufficient amount for known prior art detectors as to preclude use of containers which also conveniently lend themselves to configuration in a form having a pleasing appearance.

Because many other electronic devices are susceptible to interference from rf energy, it is highly desirable that the pulse spectrum be as narrow as possible. Although it is common to refer to a pulse as being of a single frequency (the resonant frequency of the circuit which produces the pulse), more correctly, a pulse includes a range of frequencies, the limits of which define the pulse spectrum. It will be appreciated that as a general rule the wider the pulse spectrum, the greater the number of devices susceptible of being interfered with. It has been found that the pulse spectrum of a pulsed radar detector is directly proportional to the increase of the input signal as the amplifier makes the transition from a non-oscillating to an oscillating state.

An example of a pulsed radar detector is described in my United States application for patent Ser. No. 161,917, filed July 9, 1971, which application is assigned to the same assignee as the present application. The pulsed radar detector described in application, Ser. No. 161,917 comprises an oscillator and a bias network which operates the oscillator in a pulsed or relaxation fashion, i.e., it causes the oscillator to alternate between an oscillating and a non-oscillating state. The oscillator includes a feedback amplifier and the bias network includes a capacitor which is coupled to provide the capacitor charge as the amplifier input. When the oscillator is in a non-oscillating state (an interpulse interval) the input is insufficient for the amplifier to oscillate; during this time, the capacitor is gradually charged until finally the input is sufficient. As described in greater detail in the above identified application, the pulse rate of the oscillator is a function of the phase of the amplifier in much the same way as the oscillator frequency is related (according to Barkhausen's criteria) to the phase of the feedback signal. This pulsed radar detector also includes a negative feedback voltage regulator. The regulator output is applied to the bias network to charge the capacitor and is regulated in inverse proportion to the oscillator repetition rate. By thus adjusting the bias network charging voltage, the radar detector was made to be stable for a broad range of environments (i.e., to have essentially the same quiescent reference signal).

I have now discovered an improved detector which is stable for an even greater range of environments. According to my present invention, I provide a pulsed radar detector in which the amplifier input, the bias voltage, is clamped essentially as the amplifier commences oscillation to limit the bias voltage increase and produce a pulse having a narrow spectrum. The invention also encompasses a radar detector in which a phase-shift circuit adjusts the phase of the amplifier feedback signal to provide a quiescent reference signal which is nearly independent of the detector's environment.

BRIEF SUMMARY OF THE INVENTION

Briefly, my invention comprises a radar detector in which a pulsed oscillator includes a feedback amplifier having an input, an output, and a feedback path connecting the input to the output. The feedback amplifier of the oscillator is alternately biased between an oscillating and a non-oscillating state with an input signal from a bias network. The repetition rate of the oscillator is a function of the phase of the amplifier feedback signal, and the feedback signal normally has a predetermined phase. The radar detector includes means for providing a reference signal representative of the phase of the feedback signal. A phase-shift means is responsive to a change of the reference signal from a signal corresponding to a feedback signal of the predetermined phase to a new signal to shift the phase of the feedback signal back to the predetermined phase to maintain the reference signal and the oscillator repetition rate nearly independent of the detector's environment. The invention also encompasses a pulse spectrum limiter circuit which clamps the amplifier input signal after the oscillator commences to oscillate to provide a pulse of rf energy having a narrow spectrum.

BRIEF DESCRIPTION OF THE DRAWINGS

A detailed description of an illustrative embodiment of the present invention shall now be described with reference to the accompanying drawing wherein:

The single FIGURE is an electrical schematic illustration of an embodiment of the invention particularly adapted for use in connection with a security system radar detector.

DETAILED DESCRIPTION

The embodiment of my invention illustrated in the FIGURE is specifically intended for use in a radar detector security system and is adapted for use in a system such as the aforedescribed system of application, Ser. No. 161,917. In the FIGURE the basic circuit of the present invention is shown together with circuitry provided to adapt circuit for use with the security system.

With reference to the FIGURE, the basic circuit is shown to comprise an oscillator 10, a phase-shift network 12, and a pulse spectrum limiter circuit 14. The oscillator 10 includes a feedback amplifier, shown as an NPN transistor 16, and a resonant circuit formed primarily by a variable capacitor 18 and a microstrip 20. A variable length transmitting antenna 22 is coupled by an antenna loading inductor 24 to the microstrip 20. The oscillator 10 also includes a bias network which includes a capacitor 26, resistor 28 and resistor 30. A terminal 32 is provided for receiving energy from a source of electrical potential (not shown) for operating the oscillator. The oscillator also includes bypass capacitors 34, 36 and 38 and radio frequency chokes 40, 42 and 44. The phase-shift circuit 12 is shown to comprise a pair a microstrips 46 and 48 coupled in series by a D-C blocking capacitor 50 and a variable capacitance diode 52. Variable capacitance diode 52 is coupled to a source of control voltage by lead 54. The control voltage which is carried on lead 54 corresponds to a reference signal which is representative of the feedback signal of the feedback amplifier 16. The control voltage varies directly as the oscillator repetition rate, the reactance of the variable capacitance diode varies inversely as the control voltage, and the repetition rate of the oscillator varies directly as the reactance of the variable capacitance. Accordingly, a variation in the voltage on lead 54 varies the reactance of the phase-shift circuit 12 to change the phase of the feedback signal of the amplifier 16. The radar detector also includes a variable length receiving antenna 56 which is coupled to the microstrip 46 to provide energy received by antenna 56 as an external feedback signal to feedback amplifier 16.

The pulse spectrum limiter circuit 14 is shown to comprise only three components, 60, 64 and 66. The circuit presents a variable impedance in shunt with the input to feedback amplifier 16, having a high impedance when the amplifier is in a non-oscillating state but having a low impedance when the amplifier is oscillating to clamp the amplifier input voltage. A PNP transistor 60 is coupled by its emitter to the base of amplifier 16 and by its collector lead through a capacitor 38, and inductor 40 to the emitter of amplifier 16. The other two components, a resistor 64 and capacitor 66 are coupled in series between the transistor 60 emitter lead and ground, and the base lead of transistor 60 is connected between capacitor 66 and resistor 64. During an interpulse interval, with amplifier 16 in a non-oscillating state, the voltage drop across resistor 64 is insignificant and thus transistor 60 is non-conducting. As amplifier 16 commences to oscillate, the amplifier input rises rapidly. By selection of the values of resistor 64 and capacitor 66 in a well known manner, this rapidly increasing input voltage will be reflected across resistor 64 to provide a sufficiently positive emitter to base voltage differential that transistor 60 will conduct to clamp the input of amplifier 16.

The function of the remaining circuitry shown in FIG. 1 is chiefly to adapt the basic circuit for use in connection with the radar system disclosed in application Ser. No. 161,917. Briefly, the remaining circuitry comprises an output circuit 70 (basically an emitter follower circuit which produces a pulse-period modulated output signal the two excursions of which correspond to respective oscillating and non-oscillating states of the amplifier). The output circuit 70 comprises a PNP transistor 81 connected as an emitter follower, having an input coupled through capacitor 76 to the base of transistor 81 and to bias resistor 78, and provides an output through RF choke 80 to output terminal 79.

In application, Ser. No. 161,917, this pulse-period modulated signal is applied to a single-shot circuit whose output is coupled through an emitter follower to an integrator. The integrator output is in turn applied as the input to another emitter follower the output of which is an analog voltage which, as described in the application, varies inversely as the oscillator repetition rate. The amplitude of this analog voltage thus provides a convenient reference signal, although for use with the present circuit it is inverted since the control voltage impressed on the variable reactance diode 52 must vary directly as the oscillator repetition rate.

The circuit of the figure is designed to operate in response to such an analog voltage coupled to terminal 32. Since the potential at terminal 32 also acts to charge the bias network, a bias stabilization circuit 72 is included. The bias stabilization circuit compensates for changes in the control voltage to hold the amplifier input constant. For an increase in the analog voltage (which would reduce the time required to charge the bias network, and hence reduce the interpulse interval) the current drawn by transistor 88 also increases as does the voltage drop across resistor 86. The bias stabilization circuit 72 comprises an inverting control transistor 88 which senses the emitter current from the feedback amplifier 16 through resistor 92, and increases or decreases the bias voltage through resistor 30, as a result of the voltage level of the emitter of amplifier 16 being too high or too low. Integrating capacitor 90 is coupled across the base and collector of transistor 88 and operates together with resistor 86, the current source resistor for transistor 88, to control the response time. The voltage drop across resistor 30 remains essentially constant to hold the amplifier input constant. A temperature compensation circuit which compensates for variations due to temperature of both the bias stabilization and oscillator circuits is shown generally as 74. Such temperature changes are manifested by a change in the voltage at the emitter of amplifier 16, which causes a corresponding change in the voltage across the voltage divider network comprising resistor 62 and the temperature compensation network 74. The thermistor 96 is connected in parallel with resistor 98, both of which are coupled in series with resistor 94, such that temperature changes also produce changes in the voltage applied to the base of transistor 88.

In one embodiment, the components of the circuit of FIG. 1 were as follows:

Transistors
16  NPN, 2N5179
60  PNP, 2N5355
81  PNP, 2N5355
88  NPN, 2N3392

Resistors
28  56 ohm
30  12 K ohm
62  1.2 K ohm
64  10 K ohm
78  10 K ohm
86  10 K ohm
92  10 K ohm
94  390 ohm
98  820 ohm Capacitors
18  0.1 to 0.8  pico farads, variable
26  0.47  micro farads
50  22  pico farads, chip, D-C blocking
66  0.01  micro farads
76  0.047  micro farads
84  0.01  micro farads
90  1.5  micro farads 34, 36 and 38  rf by-pass capacitors formed by sandwiching a dielectric between a printed circuit conductor and a strip of conductor soldered to the ground plane of the printed circuit assembly.
20 microstrip  (horizontal segment about 4 mm long by 3 mm wide; vertical segment about 24 mm long by 3 mm wide)
24 antenna  loading inductor (formed by a narrowing of the printed circuit conductor.
40 and 100  radio frequency choke (formed by a narrowing of the printed circuit conductor).
42, 44, 80 and 82  radio frequency chokes (each a 5 K permeability ferrite bead strung on a component lead or straight wire).
46 microstrip  (2.5 mm wide by 19 mm long)
48 microstrip  (2.5 mm wide by 7 mm long)
52  variable capacitance diode Motorola part No. MN2101
96  thermistor 1.3 K It is to be recognized that the foregoing is given by way of example and not limitation. My invention has broader application than the embodiment illustrated and described in reference to FIG. 1. One skilled in the art will readily appreciate that the spectrum limiting and phase shifting circuits of my invention can be readily adapted for use with other than relaxation type oscillators. As one example, they may be used in conjunction with superregenerative self-quenching type oscillators.

What is claimed is:

1. In a radar detector comprising a pulsed oscillator an transmitting and receiving means including a feedback amplifier having an input, an output and a feedback path connecting the input to the output, the repetition rate of which oscillator is a function of the phase of the amplifier feedback signal and which feedback signal normally has a predetermined phase, the improvement comprising:

means for providing a reference signal representative of the phase of the feedback signal; and phase-shift means responsive to a change of the reference signal from a signal corresponding to a feedback signal of the predetermined phase to a new signal to shift the phase of the feedback signal back to the predetermined phase to maintain the reference signal and the oscillator repetition rate nearly independent of the detector's quiescent environment and responsive to a reflected signal received by the receiving means to provide an external feedback signal for influencing the repetition rate.

2. A radar detector according to claim 1 wherein:

the phase-shift means comprises an electrical network the reactance of which varies inversely as an impressed control voltage;

the reference signal means comprises means for producing the reference signal as an analog voltage the amplitude of which is directly proportional to the oscillator repetition rate; and the analog voltage is applied as the control voltage to the electrical network to vary the reactance of the electrical network to in turn vary the oscillator repetition rate directly as the network reactance.

3. A radar detector according to claim 2 wherein the electrical network comprises a variable capacitance diode in shunt with the amplifier feedback path, and wherein the analog voltage is coupled to the diode to vary the capacitance of the diode inversely as the analog voltage.

4. In a radar detector comprising a pulsed oscillator including both a feedback amplifier and a bias network which provides an input signal to the amplifier to operate the oscillator in a pulsed mode by alternately biasing the amplifier between an oscillating and a non-oscillating state, the improvement comprising:

means for clamping the input signal after the oscillator commences to oscillate to provide a pulse of rf energy having a narrow spectrum.

5. A radar detector according to claim 4 wherein:

the amplifier comprises an NPN transistor having a base lead coupled to the bias network to receive said input signal;

the source of bias voltage comprises a capacitor coupled in parallel with a direct-current (D-C) voltage and the transistor base lead; and the clamping means comprises a variable impedance network coupled in shunt with the base lead, the variable impedance network having a high impedance when the amplifier is in a non-oscillating state but having a low impedance when the amplifier is oscillating to clamp the bias voltage input to the amplifier.

6. A radar detector according to claim 5 wherein the variable impedance network comprises:

a PNP transistor having an emitter lead and a collector lead coupled to the NPN transistor amplifier base and emitter leads, respectively; and a resistor and capacitor connected in series between the PNP transistor emitter lead and ground, the PNP transistor having a base lead coupled at a point electrically common to both a lead of the resistor and a plate of the capacitor, and the resistor and capacitor having values such that when the NPN transistor amplifier is in a non-oscillating state the PNP transistor is non-conducting but such that when the amplifier commences to oscillate the PNP transistor conducts to clamp the amplifier input.

7. A radar detector according to claim 6 wherein the D-C voltage is the control voltage and further comprising a bias stabilization circuit coupled between the control voltage and the amplifier input for compensating for changes in the control voltage to hold the amplifier input constant.

8. A radar detector according to claim 4 further comprising:
   means for providing a reference signal representative of the phase of the feedback signal; and
   phase-shift means responsive to a change of the reference signal from a signal corresponding to a feedback signal of the predetermined phase to a new signal to shift the phase of the feedback signal back to the predetermined phase to maintain the reference signal and the oscillator repetition rate nearly independent of the detector's environment.

* * * * *